Aug. 29, 1933. R. L. RIVAS ET AL 1,924,652
COMBINED WEIGHING SCALE AND LOUD SPEAKER
Filed Dec. 13, 1930  3 Sheets-Sheet 3
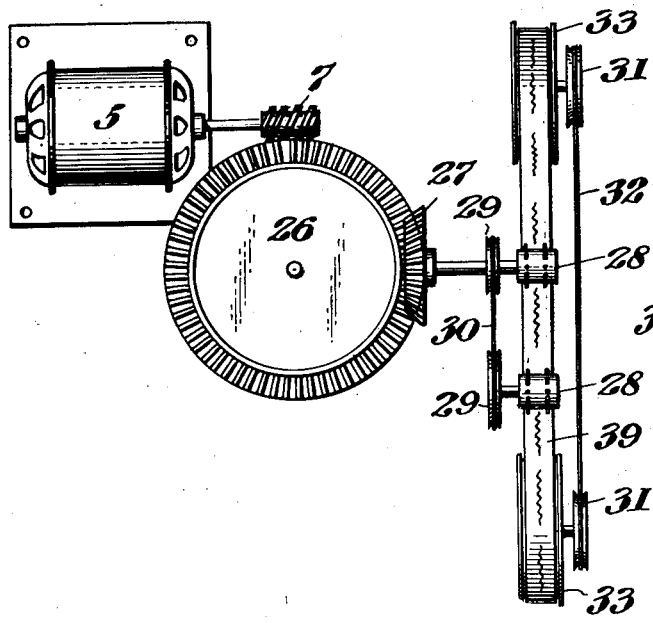
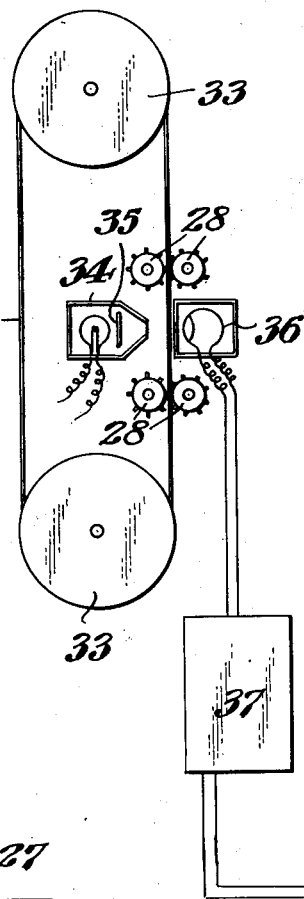
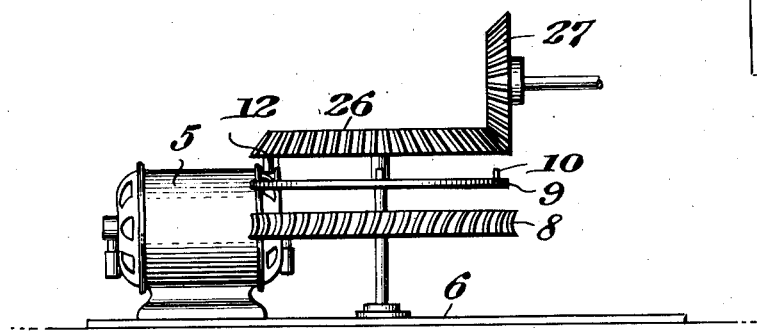
Inventors,
Raul Lopez Rivas
and Emilio Iribarne,
By Emil Bönnelycke
Atty.

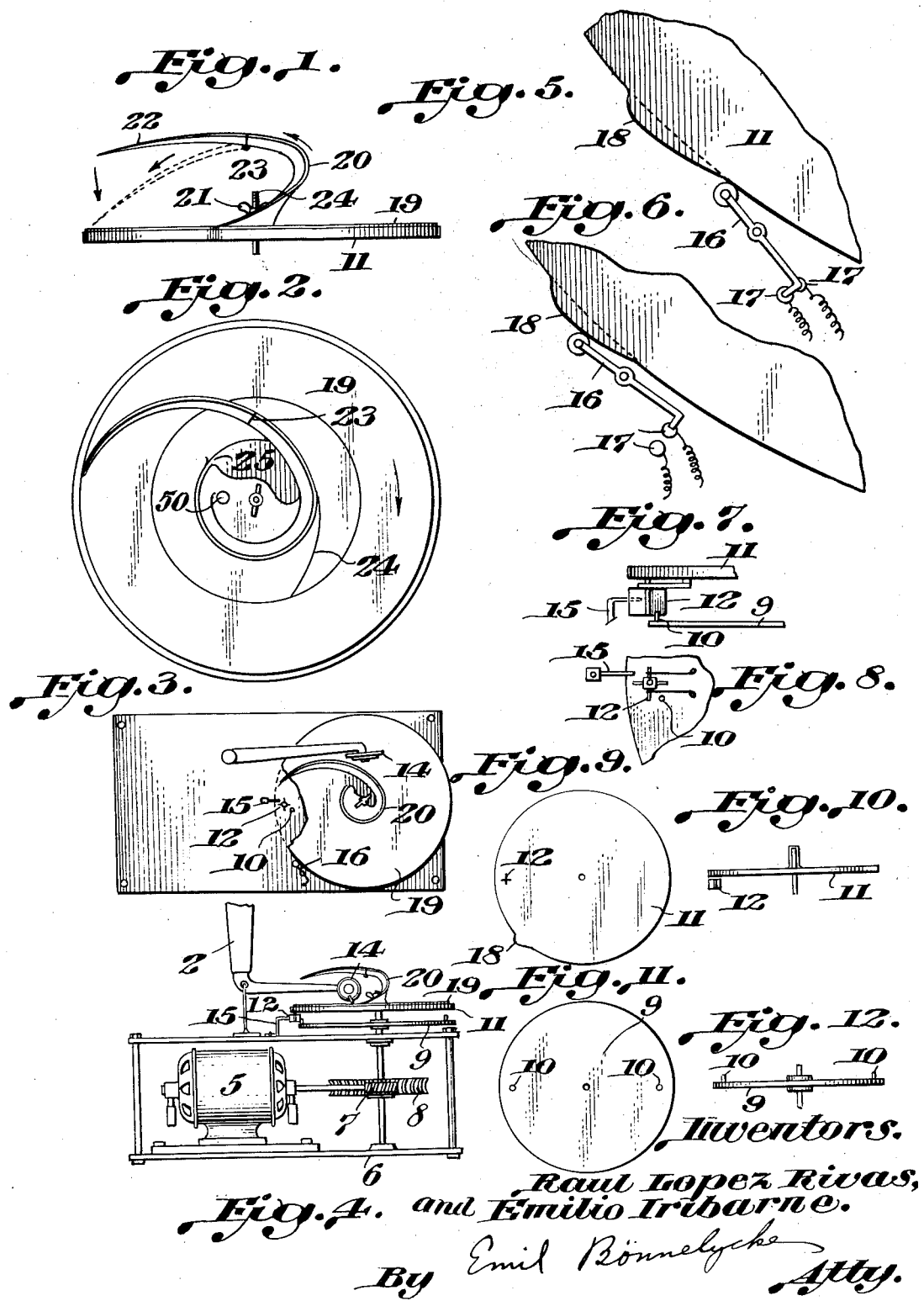

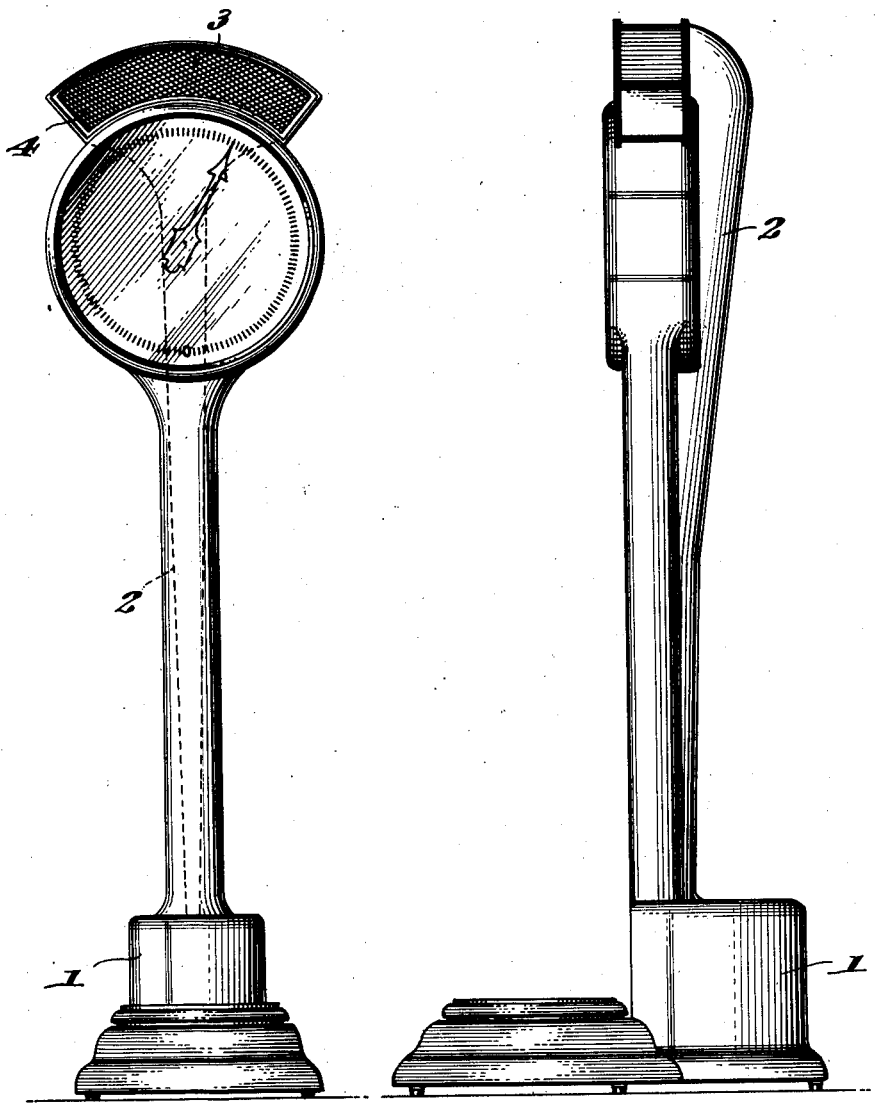

Patented Aug. 29, 1933

1,924,652

UNITED STATES PATENT OFFICE 1,924,652

COMBINED WEIGHING SCALE AND LOUD SPEAKER

Raul Lopez Rivas and Emilio Iribarne, Buenos Aires, Argentina, assignors to Juan Bossart, Buenos Aires, Argentina Application December 13, 1930, Serial No. 502,235, and in Argentina June 3, 1930

17 Claims. (Cl. 274—9)

This invention relates in general to weighing machines having accoustical mechanism associated therewith and more particularly has reference to the acoustical mechanism.

A primary object of this invention is to devise an acoustical apparatus for association with a weighing machine.

Another object of this invention is to provide an automatically operated control mechanism for controlling the operation of the acoustical apparatus.

With these and other objects in view which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

In carrying out the present invention means are provided for causing an acoustical apparatus to be placed in operation when a person or body causes the weighing platform to be depressed. The acoustical apparatus is effective for announcing the weight or for advertising while the platform is depressed and is rendered inoperative upon the platform being permitted to return to its normal position.

In order to make our invention more clearly understood, we have shown in the accompanying drawings means for carrying the same into practical effect, without limiting the improvements in their useful applications to the particular construction, which for the purpose of explanation, have been made the subject of illustration.

In the drawings,

Figure 1 is a side elevational view of a record carrying turntable constructed in accordance with the present invention.

Fig. 2 is a plan view of the device shown in Fig. 1.

Fig. 3 is a top view of the acoustical mechanism.

Fig. 4 is a side elevational view of the acoustical mechanism.

Fig. 5 is a detail fragmentary view of the record carrying turntable.

Fig. 6 is a view similar to Fig. 5 showing the circuit controlling cam carried by the turntable in a position to break an electrical circuit.

Fig. 7 is a detail view of one of the control mechanisms.

Fig. 8 is another view of the mechanism shown in Fig. 7.

Fig. 9 is a plan view of the turntable.

Fig. 10 is a side elevational view of the turntable shown in Fig. 9.

Fig. 11 is a plan view of another turntable associated with the acoustical apparatus.

Fig. 12 is a side elevational view of the turntable shown in Fig. 11.

Fig. 13 is a front elevational view of a weighing machine constructed in accordance with the present invention.

Fig. 14 is a side elevational view of the machine shown in Fig. 13.

Fig. 15 is a view of a modified form of acoustical apparatus constructed in accordance with the present invention.

Fig. 16 is another view of the modified form of acoustical apparatus.

Fig. 17 is a detailed view showing the driving connections between the electric motor and the record operating shaft.

In Figs. 13 and 14 of the drawings is shown a a weighing machine constructed in accordance with the present invention. This machine comprises the usual platform and indicating mechanism. It differs, however, from ordinary weighing machines in the provision of the casing 1 in which is positioned the sound reproducing means. In addition, a speaker 2 is provided by means of which sound can be produced. The speaker may be provided with a protective wire screen 4 positioned on the mouth of the outlet 3 thereof so as to prevent foreign material being introduced into the speaker. While in Figs. 13 and 14 the speaker has been shown positioned directly above the weight indicating dial, nevertheless it will be appreciated that other positions of the speaker may be selected.

Since the principal object of the present invention is in the construction of the sound-reproducing mechanism, the detailed showing of this mechanism is clearly illustrated in Figs. 3 and 4. In Fig. 4 it will be noted that an electric motor 5 is fastened onto the base 6 of the sound-reproducing unit. The electric motor has a worm 7 fixed to its shaft which worm engages the gear 8 which is mounted on a vertically positioned shaft. The ratio between the worm 7 and the gear 8 is so adjusted that the speed of rotation of the shaft on which gear 8 is mounted will be limited to approximately sixteen revolutions per minute. The shaft on which the gear 8 is mounted extends upwardly through the top plate of the reproducing unit and has a plate or disk 9 fixed thereon. The plate or disk 9 does not support the sound-reproducing record, but is provided solely for the purpose of transmitting rotary motion to the turntable which is loosely and freely rotatably mounted upon the axis or shaft extending through the plate 9. The turntable 11 upon which the sound-reproducing record is adapted to be placed has rotary motion transmitted thereto by means of an element 12 mounted on the under side thereof adjacent its outer periphery. As clearly shown in Figs. 4 and 12, the plate 9 is provided with diametrically positioned pins 10. These pins, upon rotation of the plate 9, engage the cross-like element 12 and cause the turntable 11 to rotate therewith.

In accordance with the present invention, it is desired to have the turntable stop after making a single revolution. The connection between the plate 9 and the turntable 11 is so constructed as to disconnect the plate 9 from the turntable 11 after the same has completed a single revolution. As clearly shown in Figs. 7 and 8 of the drawings, the member 12 consists of a shaft pivotally mounted in the lower portion of the turntable 11 adjacent its outer periphery. The member 12 consists of a four-bladed gear or star wheel which is freely rotatable upon its supporting shaft. In order to carry out the purpose of the present invention, means are provided on the lower portion of the turntable 11 adapted to cooperate with the member 12 to prevent rotation of the member 12 unless a predetermined force is applied.

In operation, one of the pins 10 carried by the plate 9 will engage one of the blades of the member 12 as shown in Figs. 7 and 8. Upon the pin 10 engaging one of the blades of the member 12, the turntable 11 will be caused to rotate with the plate 9, due to the inability of the member 12 to rotate upon its supporting shaft. However, one of the other blades of the member 12 engages the elements of the member 15. Any further tendency of the pin 10 carried by the plate 9 to cause the turntable 11 to rotate will also produce a couple with the stop 15 causing the element 12 to rotate counter clockwise, as shown in Fig. 8. In rotating counter clockwise 90°, the blade which was in contact with the pin 10 will be moved out of position and the pin may freely pass by the member 12. The plate 9 will, of course, continue to rotate and the turntable 11 will be substantially stationary. When the other pin 10 is moved around to a position whereby it engages another blade of the element 12, it will cause the turntable 11 to move through one complete revolution until the blade of the member 12 again engages the stop element 15. Upon engagement with the stop element 15 the element 12 will be rotated 90° counter clockwise and pin 10 will be free from engagement with the element 12.

The connecting device just described is of particular advantage in connection with the present invention for effecting intermittent starting and stopping of the sound-reproducing mechanism. When the platform of the weighing machine is depressed, a connection is effected in an electrical circuit for energizing the motor 5. Means, of course, can be provided for completion of this connection only upon deposition of a proper coin in the weighing machine. When, however, the circuit is completed to the motor 5, the latter will be energized and the plate 9 will be rotated at approximately sixteen revolutions per minute.

Now, if the platform of the scale or weighing machine is allowed to return to its normal position, the electrical circuit would be broken and the motor 5 would, of course, be stopped. In order to avoid this taking place, means are provided which are affected after partial rotation of the turntable 11 for maintaining the electrical circuit completed until the turntable has made one complete revolution. In order to produce this result, a cam surface 18 is formed on the outer periphery of the turntable 11. An arm 16 is pivotally mounted adjacent the turntable 11 and has a roller adapted to engage with the cam 18. When the cam 18 and the roller carried by the rocker arm 16 are in engagement, the arm will be in the position shown in Fig. 6 and the contact points 17, one of which is mounted on the free end of arm 16, will be separated. When, however, the cam 18 is in position out of contact with the roller on the end of arm 16, an electrical connection will be established through the contact points 17. Thus, when the turntable is in the position shown in Fig. 6, the electrical circuit can be completed only by depression of the platform of the weighing machine. If the platform is depressed long enough to permit the turntable to rotate to a position whereby the cam 18 will be out of contact with the roller on the end of arm 16, an electrical circuit will be established between the points 17 and the motor 5 will continue to operate regardless of whether or not the platform of the weighing machine is depressed. Now, if the platform would be allowed to return to its normal position after the contact points 17 engaged each other, the motor 5 would continue to operate until the cam 18 reached the position shown in Fig. 6. At this point, the circuit would be broken and the operation of the device would cease.

In order to place the sound-reproducing mechanism in operation, it is only necessary to complete an electrical circuit to the motor 5. This will start the plate 9 rotating. If it so happens that the pin 10 and element 12 are in the position shown in Fig. 8, then the pin will engage one of the blades of the element 12 and will cause the same to move the turntable 11 about its axis until the stop 15 engages one of the blades of the element 12. In this instance, the pin 10 and the element 15 will cause rotation of the element 12 to permit the pin 10 to move free of the element 12. The pin 10 will, of course, continue to rotate, while the turntable 11 remains stationary. After the pin 10 has moved through approximately 180°, the diametrically positioned pin 10 will engage one of the blades of the element 12 and will cause the turntable 11 to move through substantially 360°. After moving through 360, the stop 15 will engage one of the blades of the element 12 and the latter will be rotated 90° to free pin 10 and thereby disconnect the turntable 11 from plate 9. Simultaneously or in a synchronized relation with the operation of the element 12 to stop turntable 11, the cam 18 will contact with the roller carried by arm 16 to break the electrical connection between the contact points 17. Thus, the turntable 11 will be mechanically stopped and the motor 5 will be electrically stopped. Of course, if, due to momentum, the motor 5 continues to rotate, the turntable 11 will remain stationary due to the break in the mechanical connection between the plate 9 and the turntable 11.

With an apparatus capable of operating as above described, the turntable can be stopped at the same position after a complete revolution.

The object of starting and stopping the turntable with such exactitude is necessary on account of the nature of the sound reproduction. As contemplated, the phonographic disk contains a complete advertising phrase on each circular line of the disk. A portion of each line is silent to provide for slight safety factors during starting and stopping of the turntables. As will be easily seen, this will result in a record having a silent portion at the same angular position of the record, in other words, a silent sector. With the applicants' apparatus, stepping of a person on the platform of the scale will immediately set into motion the apparatus for completing an advertising phrase on the record. If the person steps off, the record continues to produce the advertising phrase until it is completed, after which it will stop at its silent sector. In another aspect, the record can be so made that it will have several silent sectors, the turntable being stopped at one of these sectors and at no other point. If a person remains on the platform, the turntable continues in operation so that the advertising phrases continue in succession as long as the person remains on the platform and afterward for the time necessary to complete the last advertising phrase. Pin 50 on the surface of the turntable is provided in order to initially position the record with respect to the turntable so that the silent sector is in agreement with the cam 18 so that it starts and stops at the desired position.

To make the operation entirely automatic, that is, to provide for automatically transferring the needle and sound-box 14 of the reproducing device from the end of the record to the beginning of the record, the applicants have provided an automatic transfer device 20, which has a spiral shape. When the arm carrying the sound-box approaches the end of the record, it is caught on the lower and inner end of the spiral member so that it rides along the top of the spiral. The last and outer portion 22 of the spiral is spring pivoted, so that as the arm carrying the sound-box slides along this position, its weight will swing the portion 22 about its pivot and gently deposit the sound-box in the first groove of the phonograph record. This operation is entirely automatic, so that no attention or adjustment is needed.

As a modification of the present invention, a film and photo electric sound-reproducing mechanism may be employed instead of the disk record and mechanical reproduction hereinbefore described. Figs. 15 to 17 show this modified form of the invention. In this form of the invention, the same means is provided for controlling the starting and stopping of the sound-producing mechanism. The difference consists in the substitution of bevel gear 26 for the turntable 11 of the apparatus described above. Turntable 26 is provided with the element 12 by means of which motion from plate 9 is transmitted to gear 26. Gear 26 meshes with beveled gear 27 which, in turn, is fixed on a shaft carrying a film sprocket 28 and a pulley 29. A belt 30 transmits motion from pulley 29 to another pulley mounted on a shaft carrying a second film sprocket 28. Film drums 33 are synchronized by means of a belt 32 on pulleys 31. A source of light 34 is provided, which is energized upon the platform of the weighing machine being depressed. Light from this source is concentrated by lens 35 and directed on film 39. The intensity of light passing through the film will vary as the film moves and these variations will affect the photo electric cell and produce variation in electrical energy passing therethrough. As clearly shown in Fig. 15, gear 26 is moved by the plate 9. It will also be noted that gear 26 is directly connected to the film moving apparatus. The speed ratio between the gear 26 and the film is so adjusted that the film will make one complete revolution for each complete revolution of the gear 26. Thus, the film 32 in the modifications shown in Figs. 15 and 16 will be moved in substantially the same manner as the record 19, which is placed on the turntable 11. The variation in electrical energy will be transmitted into sound by the electrical reproducing apparatus 37 and the speaker 38.

The operation of this form of the invention is so closely related to that hereinbefore described that a detailed description is not believed necessary.

It will be noted that initiation of the operation does not necessitate a scale or other force measuring device, but can be effected by any means which closes an electrical circuit. That is, opening or shutting of a door or window, movement of a lever or any other operation which can effect closing of an electrical circuit can be substituted for the weighing operation illustrated in the present application. Similarly, it may not be necessary to require the weight of the person to actuate the device, but a coin-controlled mechanism may complete the circuit.

Also, instead of an advertising phrase on each line of the phonographic record, music or other sound may be inscribed.

Further, the transfer device for transferring the sound-box may be utilized in other sound-reproducing instruments and also in sound-recording instrument. Likewise, the particular arrangement for starting and stopping the turntable 11 may be applied to other devices.

We claim:

1. A weighing device including a sound record, means for displacing the record to reproduce the sound, said means being actuated when the weighing device is operated, and means for reproducing the sound for a predetermined interval after the weighing has ceased.

2. The device set forth in claim 1, including electrical means for terminating operation of the sound record irrespective of the length of time that the weighing device is operated.

3. The device set forth in claim 1, wherein the means for displacing the record to reproduce the sound includes an electrical circuit which is closed when the weighing means is operated.

4. In an acoustic apparatus, a turntable, a motor, contact means for energizing the motor to turn the turntable, and a cam on the turntable, said cam being adapted to break the motor contact after one complete revolution of the turntable.

5. In an acoustic apparatus, a turntable, a motor, contact means for energizing the motor to turn the turntable, and a cam on the turntable, said cam being adapted to break the motor contact for a predetermined portion of each revolution of the turntable.

6. In an electrical system for reproducing sound, a turntable, a key for closing the electrical circuit to rotate the turntable, and a cam surface on the turntable, means cooperating therewith for keeping the electrical circuit closed for a predetermined time irrespective of the opening of the key.

7. In an electrical system for reproducing sound, a turntable, a key for closing the electrical circuit to rotate the turntable, and a cam surface on the turntable, means cooperating therewith for keeping the electrical circuit closed for a predetermined time irrespective of the opening of the key, said cam surface being adapted to open the circuit at the end of the time interval.

8. In a weighing apparatus, an electrical circuit adapted to be closed during the weighing operation, a motor in the electrical circuit, a turntable adapted to be driven by the motor, said turntable being adapted to rotate a sound record, a pick-up device for reproducing the sound on the sound record, automatic means for transferring the pick-up device from the end of the sound record to the beginning of the sound record, and means for continuing actuation of the motor for a predetermined interval of time not exceeding the time required for one revolution of the turntable irrespective of the length of time that the weighing device is operated.

9. In an acoustic apparatus, means for producing an audible effect, means for actuating the producing means, and means for continuing the actuation of the producing means without stopping after the first actuating means has been rendered inoperative.

10. The device set forth in claim 9, wherein the last-claimed means continues for a predetermined interval of time.

11. In a weighing apparatus, means for producing an audible effect when the weighing device is operated, and means for continuing the audible effect for a predetermined period of time after the weighing operation has been completed.

12. In an acoustic apparatus, a turntable, a cross element pivoted on the turntable, an arm adapted to be driven by a motor, and a friction tip at the end of the arm and adapted to contact with the turntable, said friction tip abutting against the pivoted cross element to drive the turntable when the speed of the arm exceeds a predetermined value.

13. In a sound-reproducing apparatus, a turntable, a fixed stop, and friction means mounted on the turntable and adapted to contact with the fixed stop to stop the turntable when the speed of the turntable falls below a predetermined value.

14. A sound record including a portion which contains a silent sector so positioned as to stop reproduction at least once during each complete revolution.

15. In an acoustic apparatus, a sound record, means for displacing the record to reproduce the sound, and means for always stopping the record at the same angular position at least once during each revolution.

16. In an acoustic apparatus, a sound record, means for displacing the record to reproduce the sound, and means for always stopping the record at least once during each complete revolution at a predetermined angular position.

17. In a sound-reproducing apparatus, a sound record, means for displacing the record to reproduce the sound, a pick-up device for converting the vibrations of the sound record into sound, and means positioned above the sound record and actuated by the record displacing means to automatically transfer the pick-up device from the end of the record to the beginning of the record, said transfer device comprising a spirally-shaped cam on which the pick-up device is adapted to slide, said transfer device including a pivoted portion near the end of its travel which is adapted to be pivoted under the weight of the pick-up device to eliminate shock when the transfer device is placed on the sound record.

RAUL LOPEZ RIVAS.
EMILIO IRIBARNE.